(12) United States Patent
Zhou et al.

(10) Patent No.: US 11,770,185 B2
(45) Date of Patent: Sep. 26, 2023

(54) DYNAMIC SPECTRUM SHARING DYNAMIC MODE SWITCH IN TIME DIVISION MULTIPLE ACCESS

(71) Applicant: AT&T Intellectual Property I, L.P., Atlanta, GA (US)

(72) Inventors: Jianchun Zhou, Bellevue, WA (US); Ming Zhang, Bellevue, WA (US); Sameer Sangal, Redmond, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 41 days.

(21) Appl. No.: 17/241,626

(22) Filed: Apr. 27, 2021

(65) Prior Publication Data

US 2022/0345211 A1    Oct. 27, 2022

(51) Int. Cl.
*H04B 7/26*    (2006.01)
*H04W 72/04*    (2023.01)
*H04W 72/0446*    (2023.01)

(52) U.S. Cl.
CPC ...... *H04B 7/2643* (2013.01); *H04W 72/0446* (2013.01)

(58) Field of Classification Search
CPC .......................... H04B 7/2643; H04W 72/0446
USPC .......................................................... 370/337
See application file for complete search history.

(56) References Cited

U.S. PATENT DOCUMENTS

| | | | |
|---|---|---|---|
| 2009/0103447 A1* | 4/2009 | Harada | H04L 1/1887 370/252 |
| 2021/0153066 A1* | 5/2021 | Guha | H04L 47/32 |
| 2022/0124687 A1* | 4/2022 | Takeda | H04L 5/001 |

FOREIGN PATENT DOCUMENTS

| | | | | |
|---|---|---|---|---|
| JP | 2007124682 A | * | 5/2007 | H04L 1/1845 |
| WO | WO-2021221403 A1 | * | 11/2021 | |

* cited by examiner

*Primary Examiner* — Faisal Choudhury
(74) *Attorney, Agent, or Firm* — GUNTIN & GUST, PLC; Andrew Gust

(57) ABSTRACT

The spectrum sharing dynamic mode switch in TDMA may allow for the transmission of only one radio mode per transmission time interval (TTI). Such system may address radio interference or retransmission (reTX) failures, among other things.

20 Claims, 11 Drawing Sheets

DYNAMIC SPECTRUM SHARING DYNAMIC MODE SWITCH IN TIME DIVISION MULTIPLE ACCESS

BACKGROUND

Some operators have been able to close legacy networks and refarm the frequencies to long-term evolution (LTE), but many others have kept 2G and 3G running to maintain legacy devices and provide circuit-switched voice support. As a result, many operators do not have spectrum available to deploy 5G on these bands. Refarming LTE to new radio (NR) is not a good option for many carriers because most of the traffic will continue to run on LTE for the next several years.

This background information is provided to reveal information believed by the applicant to be of possible relevance. No admission is necessarily intended, nor should be construed, that any of the preceding information constitutes prior art.

SUMMARY

Disclosed herein are systems, methods, and apparatuses for implementing DSS dynamic mode switching in TDMA. In an example, an apparatus may have a processor and memory coupled with the processor. The process may execute instructions comprising receiving a first message from a user equipment, wherein the first message includes: an indication of a location of the user equipment, wherein the location is within the bounds of a cell area of a first base station, and an indication of one or more radio modes of the user equipment, wherein the one or more radio modes of the user equipment is new radio (NR) or long-term evolution (LTE); determining, based on the first message, a transmission time interval (TTI) for the one or more radio modes of the user equipment; and sending, to the user equipment, a second message, wherein the second message may include an indication of the TTI for the one or more radio modes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

5G NR and LTE may co-exist several more years since LTE and NR have similar radio performance. Dynamic Spectrum Sharing (DSS) which shares radio resources between 5G NR and LTE will be a key feature that will allow the introduction of 5G on existing LTE bands without re-farming carriers and with a minimal impact on live end-user service. Dynamic spectrum sharing (DSS) is a new antenna technology that enables the parallel use of LTE (e.g., 4G) and 5th Generation (5G) new radio (NR) in the same frequency band. The technology can determine the demand for 5G and LTE in real-time.

Current DSS performance may be considered subpar because when DSS is used there is usually only 30% throughput of single mode LTE. Therefore, how to improve DSS performance is a major study area. DSS has a large interference when two radio modes are transmitting simultaneously which is a major reason for communication degradation associated with DSS.

The disclosed system and methods may assist in addressing DSS degradation. The disclosed DSS dynamic mode switch in TDMA may allow for the transmission of only one radio mode per transmission time interval (TTI). Such system may reduce radio interference, reduce retransmission (reTX) failure, or reduce the fragmentation of the spectrum, which may result in improved DSS performance.

DSS allows LTE and 5G NR coexistence in the same carrier using spectrum sharing. LTE and NR devices have access to the entire bandwidth. Resources are shared dynamically between the two radios based on traffic demand in the time and frequency domains. Mobile operators can therefore adapt to traffic demand. In addition, they can roll out DSS through a software upgrade. These advantages make DSS a great opportunity for mobile operators, even though it increases scheduling complexity because it requires rapid coordination between the two technologies.

Figure 1:
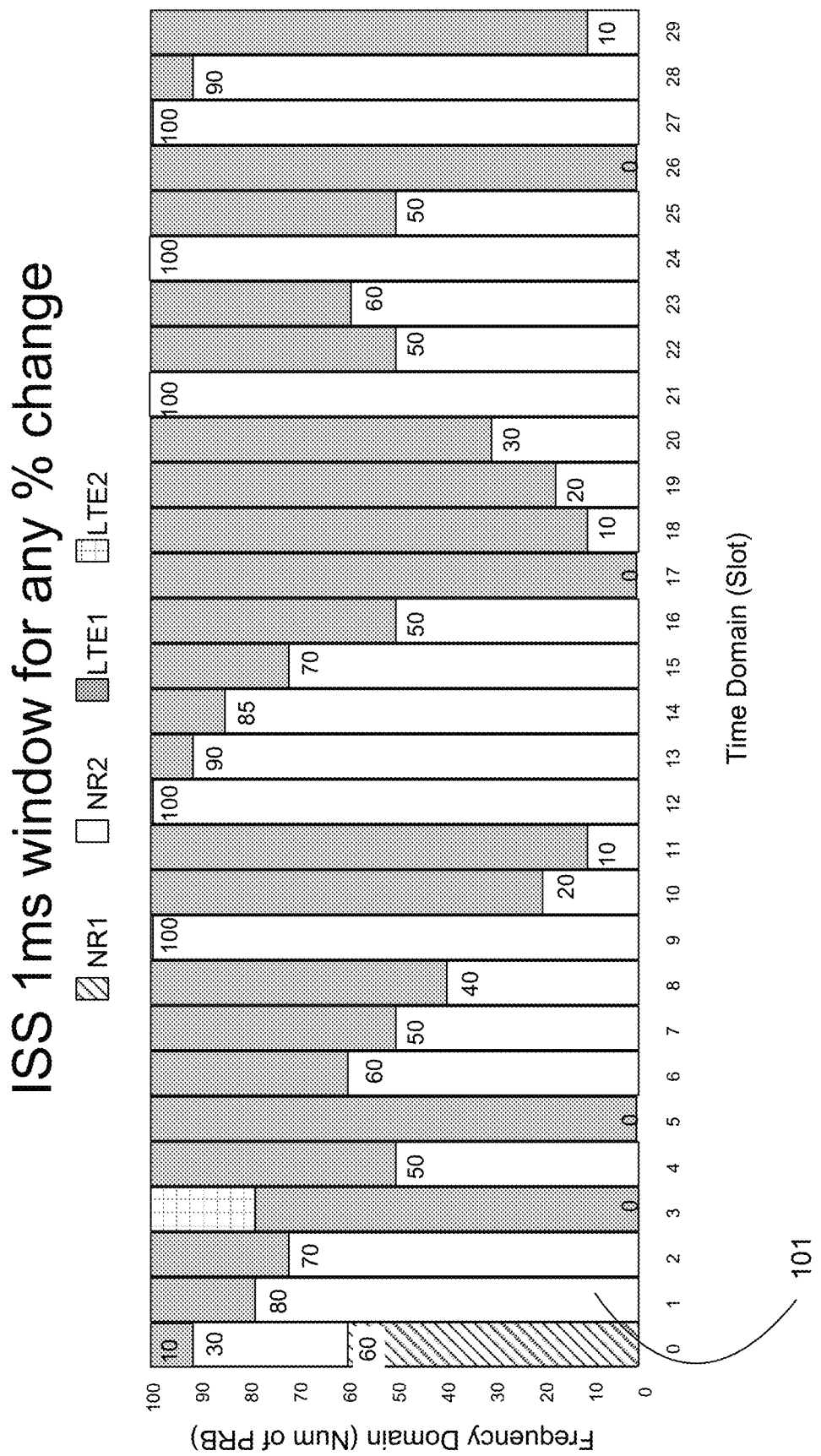
FIG. 1 illustrates an exemplary dynamic spectrum sharing (DSS) algorithm chart.

FIG. 1 illustrates an exemplary DSS algorithm chart. The radio spectrum is shared in 1 ms (per slot) between LTE and 5G NR users with a different spectrum share percentage based on the LTE data buffer and 5G NR data buffer. The buffer may be stored at radio network at Radio link control (RLC) layer. The buffer may be 10 times of radio available capacity. There may also be a buffer for reTX in case initial TX fails, in which the packet in buffer may be cleared when receiving ACK from UE. The determining of the TTI can be based on radio condition. When LTE measurement report is better from UE, the network can schedule more slots for LTE vice versa for 5G NR.

Figure 2:
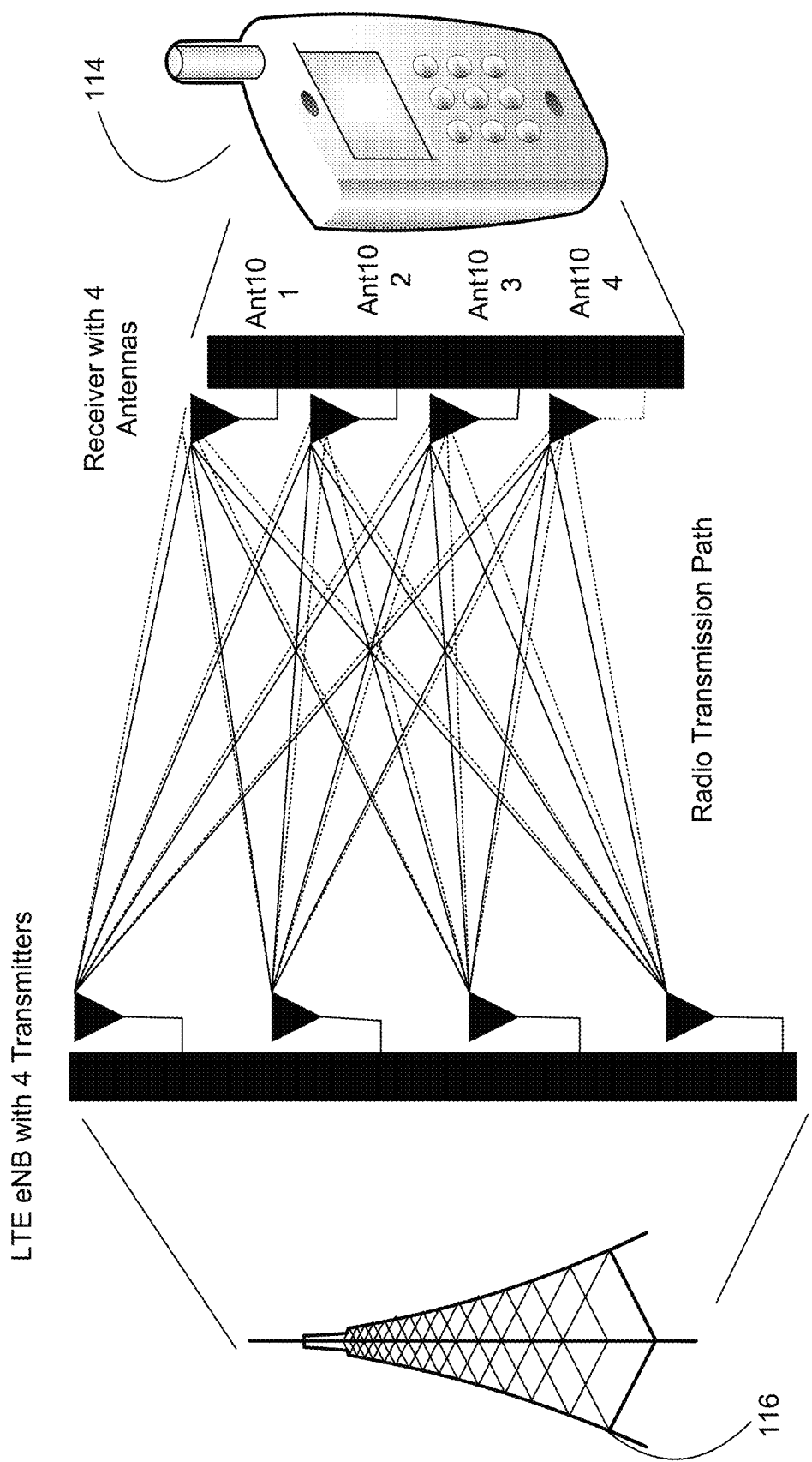
FIG. 2 illustrates an exemplary transmission path.

As disclosed, there may be large interferences between LTE and 5G NR. When LTE and 5G NR co-exist in the same time slot (e.g., slot 101, among others), it means both are transmitting simultaneously. This simultaneous transmission usually generates a large interference, especially in middle band (MB) and high band (HB) with MIMO4×4. The large interference has been found to be due to the number of transmission paths doubling from single mode 16 to 32 paths for DSS dual mode. The "cross talking" between 32 paths (also called high channel correlation) brings many difficulties for a UE 114 of FIG. 2 to decode since the 32 signal paths are differentiated by difference of phases, polarization direction, or radio mode at same frequency channel. FIG. 2 illustrates an exemplary transmission path. For example, as shown, 16 red line paths for LTE TX and 16 red line paths for 5G NR TX. In total this single UE 114 has 32 radio transmission paths. In a single mode setting we have found that conventionally the UE 114 may have subpar performance with 16 paths at MIMO 4×4 LTE due to the imbalance of RSRP/RSRQ in antenna 111, antenna 112, antenna 113, and antenna 114 (e.g., ant1/2/3/4). In addition, since antenna 113 and antenna 114 are assistant antennae, they are not as good as the main antenna, which is antenna 111, and the diversity antenna, which is antenna 112. With the attempted use via DSS, it is even more difficult for these 4 antennae to distinguish 32 paths signal.

Further, conventional implementations of DSS may cause a physical resource block (PRB) group to be fragmented. The minimum number of PRB in the PRB group is 4 for 5G NR and 6 for LTE. If total spectrum includes 52 PRBs, then 50% of the shared spectrum should be 26 PRBs, but since 26 can't evenly be divided by 4 we lose 2 PRBs with reference to 5G NR. The shared spectrum only can be assigned as 24 PRBs making 6 groups. The spectrum efficiency loses 8% since (26−24)/26=8%. If there are multiple users at TTI it could possibly create more fragmentation. Note that Resource Block Group (RBG), also is called as sub-band for frequency selective scheduling (FSS) feature that allow network to select the best sub-band based on each sub-band measurement. 4 is just a network design to optimize the sub-band performance, LTE was 6, the smaller RBG is, the better performance will be, but if too small, the processing power needed may be an issue.

Figure 3:
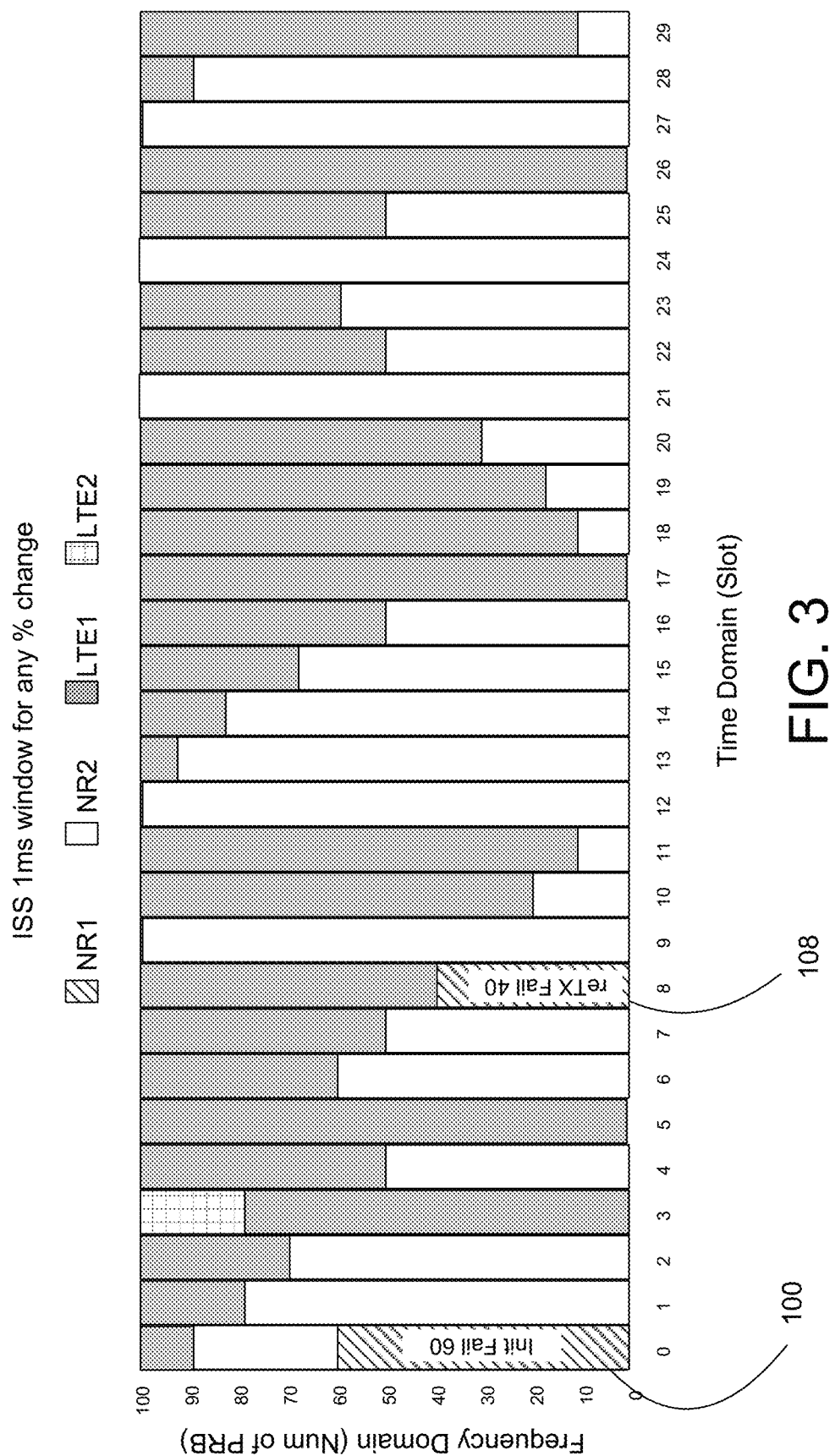
FIG. 3 illustrates an exemplary DSS algorithm chart that highlights possible failures.

In addition, conventional implementations of DSS may cause reTX failures. Due to dynamic spectrum sharing, reTX slot resources cannot be guaranteed to match with the initial-TX (init-TX) resource. FIG. 3 illustrates an exemplary DSS algorithm chart that highlights possible failures. When init-Tx fails at 5G NR slot 100 (e.g., slot-0) may include 60% resources, the reTx slot 108 (e.g., slot-8) may include only 40% resources which doesn't match the 60% in slot 100. It is also possible that slot 108 may have been assigned as 5G NR, therefore the reTX will fail since the reTx interval is always 8 slots because of the synchronized HARQ (Hybrid Automatic Repeat reQuest) reTX algorithm.

Figure 4:
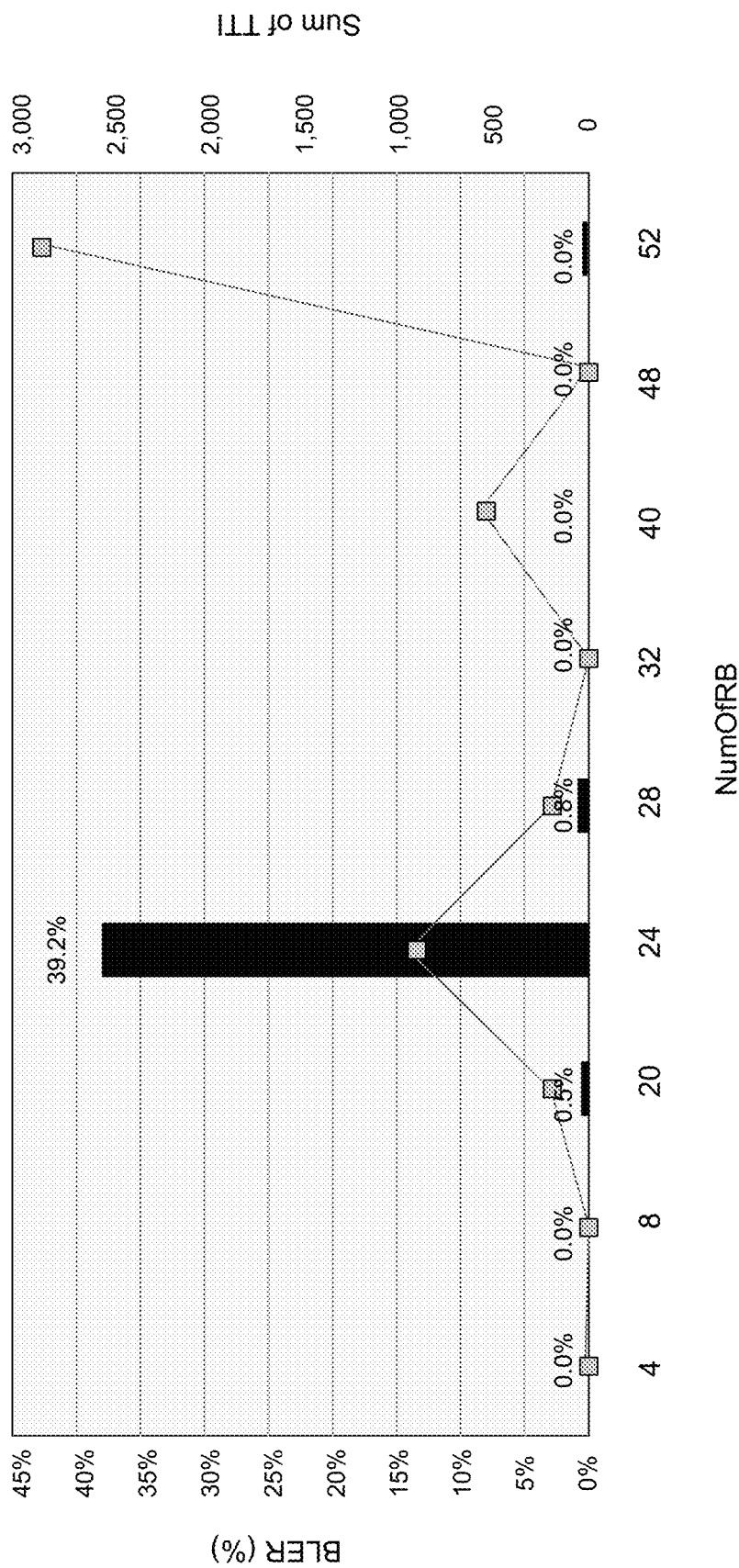
FIG. 4 illustrates exemplary field and lab results.

Field and lab results are illustrated in FIG. 4. When single mode 5G NR transmits with 52 PRBs, it has 0% block error rate (BLER). When dual mode transmits PRBs with 50% spectrum sharing, 24 for LTE and 24 for NR, it has 39% BLER which shows that dual mode may generate a large interference to trigger this high BLER.

Figure 5:
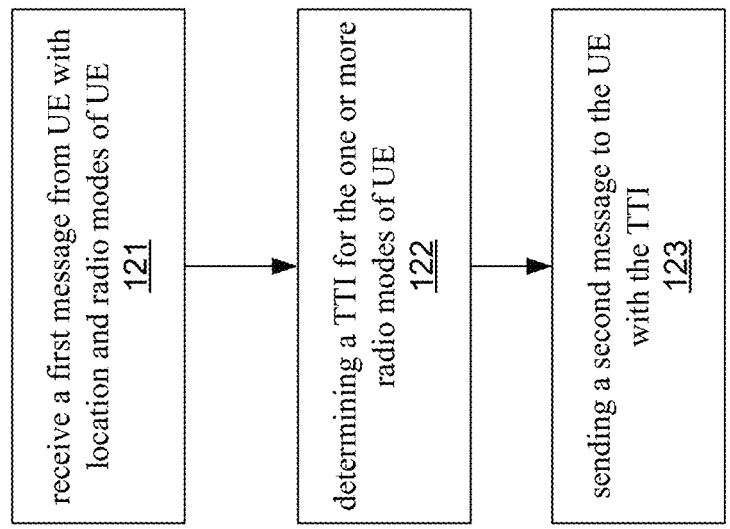
FIG. 5 illustrates an exemplary method for DSS dynamic mode switch in TDMA.

DSS dynamic mode switch in TDMA as disclosed may allow for the transmission of only one radio mode per TTI. Each mode may use its own time slot. Each slot may be assigned either LTE or 5G NR and will have minimal or no spectrum sharing in the frequency domain between LTE and 5G NR. FIG. 5 illustrates an exemplary method for DSS dynamic mode switch in TDMA. At step 121, a base station 116 or other network device of FIG. 2 may receive a first message from UE 114. The message may include a location of UE 114 which is within the bounds of a cell area of the base station 116. The message may include one or more capable radio modes of UE 114. The one or more radio modes of the user equipment may be 5G NR or LTE. At step 122, determining, based on the message of step 121, a TTI for the one or more radio modes of UE 114. In an example, the determining of the TTI may be based on a buffer size of each respective radio (e.g., different buffer sizes for each UE 114).

Figure 6:
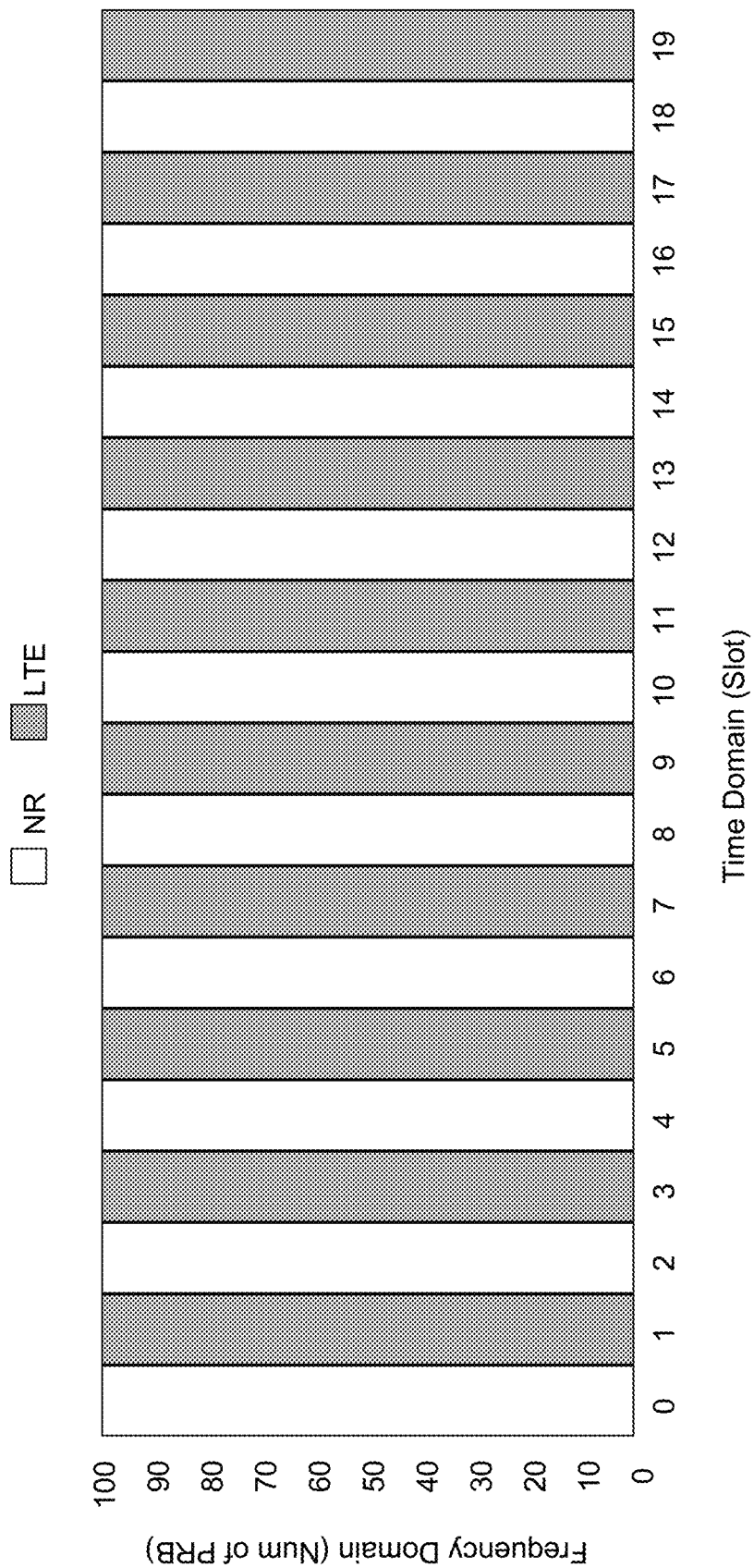
FIG. 6 illustrates an exemplary alternate slot DSS dynamic mode switch.

At step 123, sending a second message to the UE 114. The second message may include an indication of the TTI for the one or more radio modes. In an example, the indication of the TTI of the one or more radio modes of UE 114 may include alternating each time domain slot between NR and LTE. Therefore, 5G NR and LTE may be assigned alternate slots as shown in FIG. 6.

Figure 7:
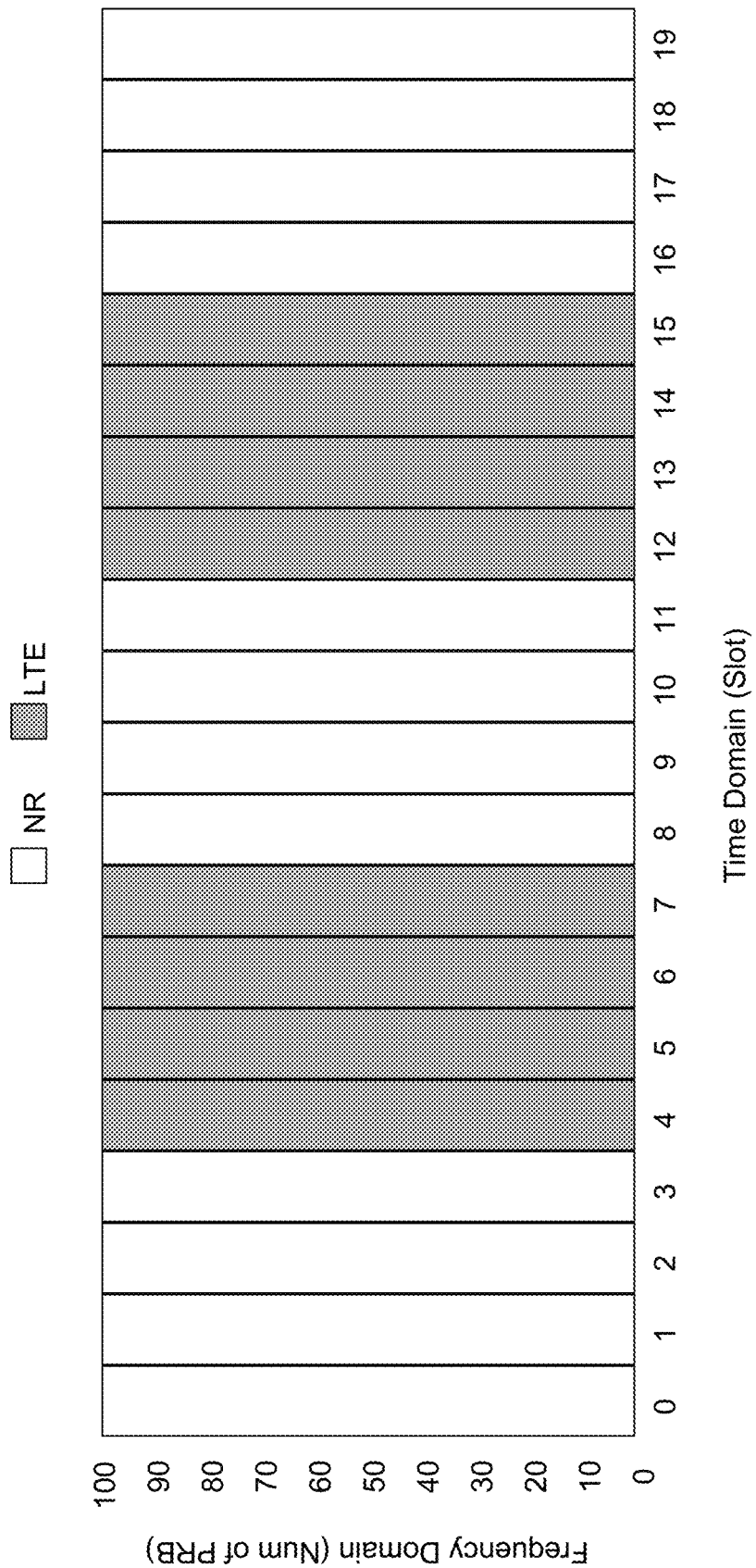
FIG. 7 illustrates an exemplary alternate continuous slot DSS dynamic mode switch.

In another example, the indication of the TTI of the one or more radio modes of UE 114 may indicate continuous alternating slots for each one or more radio modes, such as in FIG. 7. There may be 4 or 2 continuous slots assigned for one radio mode if each radio has different buffer size, but it's still a single mode in the time domain (no spectrum sharing in frequency domain). The number of continuous slots can be any number if it meets reTX interval by 8.

It is contemplated herein that initial communication with UE 114 may use the conventional DSS method for spectrum sharing in the frequency domain for implementing the plurality of radio modes. During the communication using conventional DSS there may be a monitoring for problems associated with interference, fragmentation, or reTX failures, among other things. In response to reaching a threshold level of the aforementioned problems then the DSS dynamic mode switch in TDMA system may be activated (e.g., step 121, step 122, or step 123 and further described herein). In an example, a threshold may be linked to a percentage above an average or expected threshold error rate of single mode devices (e.g., threshold of 10% more fragmentation than average single mode LTE over a 24-hour period at a location, or the like). In another example, the thresholds may be predetermined to a particular rate (e.g., reTX failure rate or spectrum efficiency level). It is contemplated that there may be a switch back and forth from conventional DSS to the DSS dynamic mode switch in TDMA based on multiple factors, which include time, network resources, network errors (e.g., BLER), or location, among other things.

Figure 8:
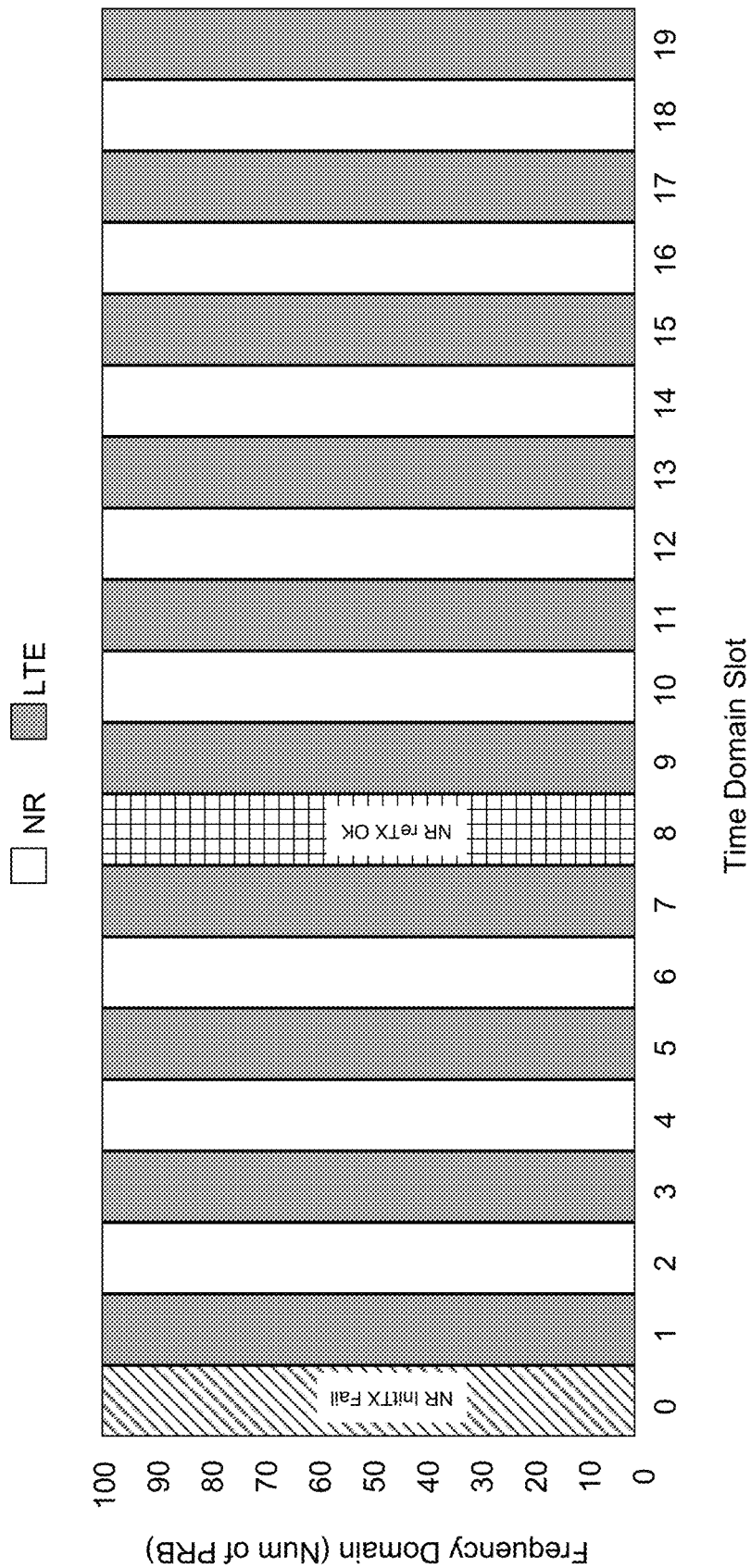
FIG. 8 illustrates a dynamic mode example.

The technical effect of the disclosed system may include reducing large interferences when one slot transmits one radio mode only and the frequency domain is not shared; reducing the fragmentation of PRB groups in a way that may improve spectrum efficiency (e.g., by approximately 8% as shown herein); or addressing the reTX failure issue since slot-8 will have the same resources as slot-0 for the same radio mode, as shown in FIG. 8. When initial TX fail at slot-0, then after 8 slots that is fixed the interval for reTX, if reTX slot-8 doesn't have same number of RBs resource as slot-0 due to DSS, the reTX can't perform until next 8 slots with same number of RB as slot-0 available, or split the slot-0 packet size, that will trigger the additional delay due to dis-assemble and reassemble the split packet. The disclosed system may improve 5G NR throughput (e.g., by 12%), if LTE CRS (16 LTE CRS symbols/132 total symbols for NR) are removed at 5G NR slots. The disclosed systems and methods may impact any application service latency because the fastest mode switch interval may be approximately 1 ms.

Figure 9:
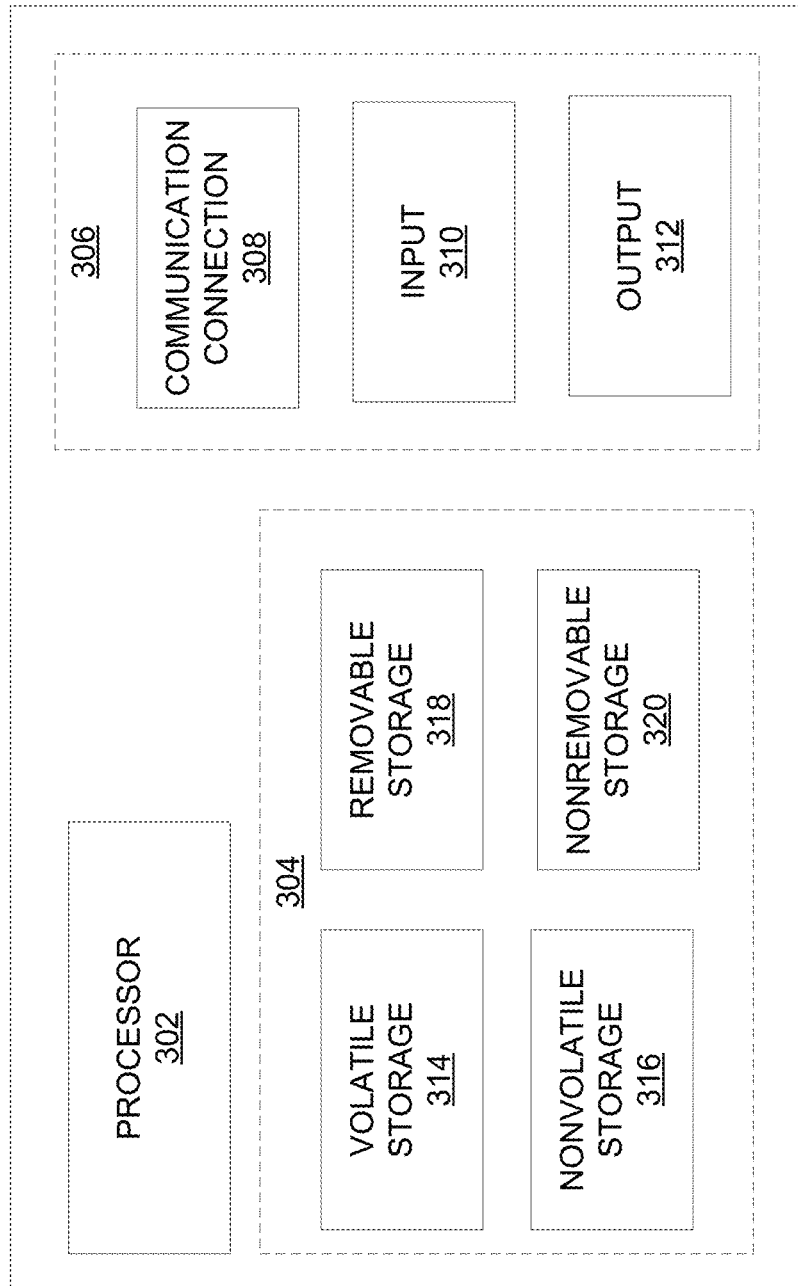
FIG. 9 illustrates a schematic of an exemplary network device.

FIG. 9 is a block diagram of network device 300 that may be connected to or comprise a component of UE 114 or base station 116. Network device 300 may comprise hardware or a combination of hardware and software. The functionality to facilitate telecommunications via a telecommunications network may reside in one or combination of network devices 300. Network device 300 depicted in FIG. 9 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 9 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 9) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 10:
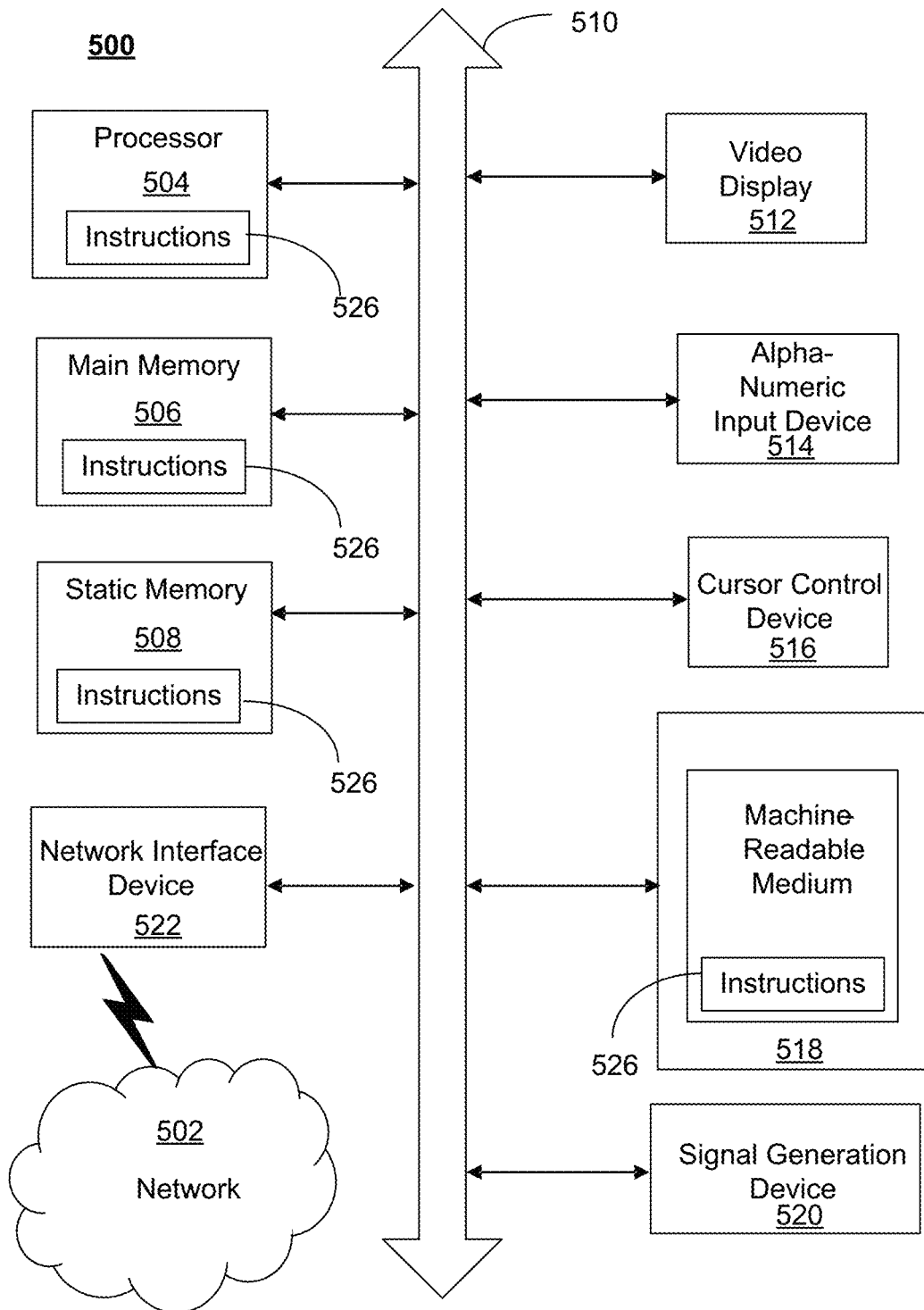
FIG. 10 illustrates an exemplary communication system that provides wireless telecommunication services over wireless communication networks.

FIG. 10 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 114, gNB, MME, SGW, HSS, PCRF, PGW and other devices of FIG. 2. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 11:
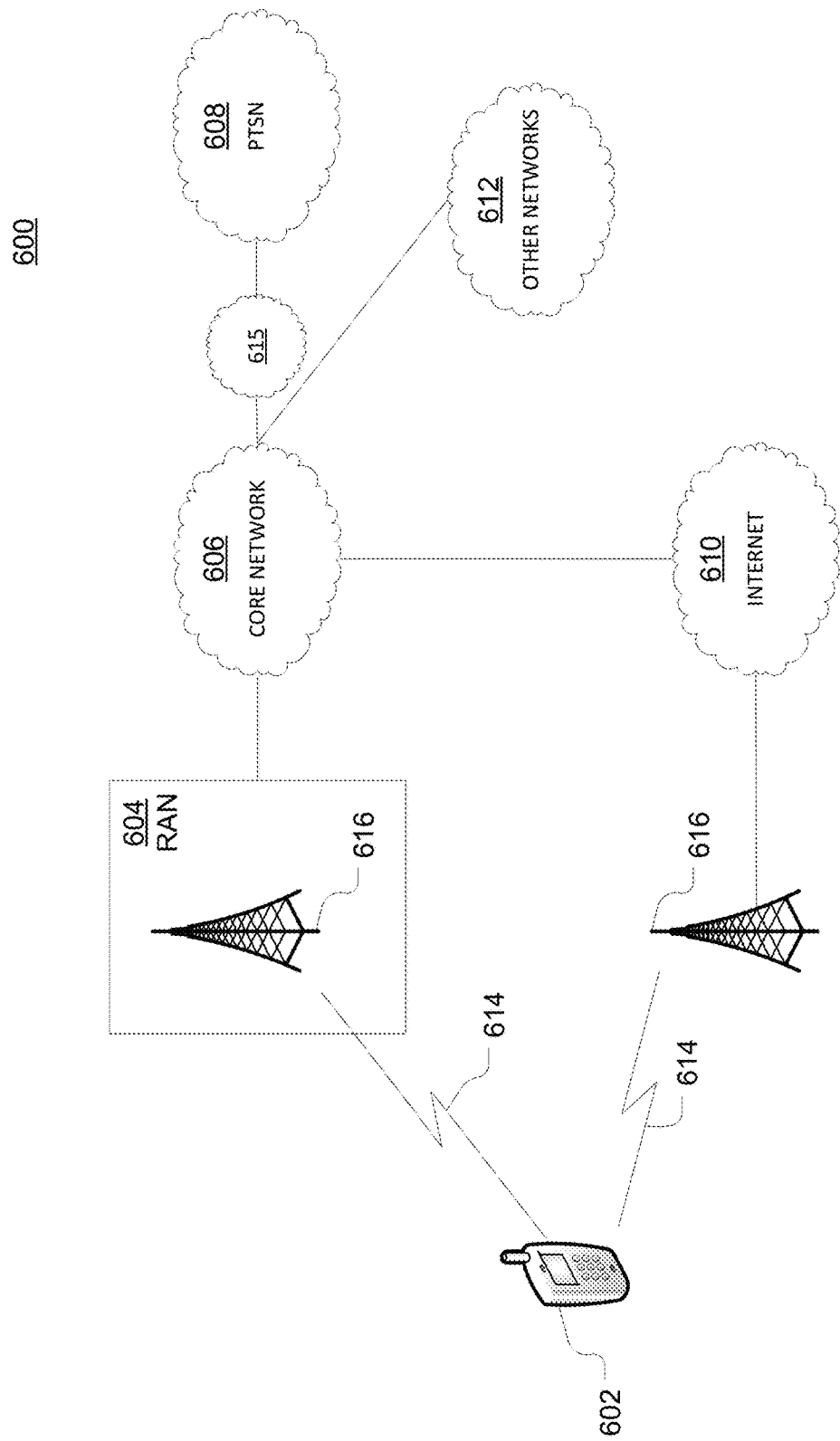
FIG. 11 illustrates telecommunication system that may include user equipment.

As shown in FIG. 11, telecommunication system 600 may include wireless transmit/receive units (WTRUs) or UE 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise a drone, a mobile device, laptop computer, or the like, or any combination thereof. By way of example, WTRUs 602 may be configured to transmit or receive wireless signals and may include a UE, a mobile station, a fixed or mobile subscriber unit, a pager, a cellular telephone, a PDA, a smartphone, a laptop, a netbook, a personal computer, a wireless sensor, consumer electronics, or the like. It is understood that the exemplary devices above may overlap in their functionality and the terms are not necessarily mutually exclusive. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, g Node B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE, new radio (NR), or the like.

Optionally base station 616 and WTRUs 602 connected to RAN 604 may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 802.11 to establish a wireless local area network (WLAN). As another example, base station 616 and associated WTRUs 602 may implement a radio technology such as IEEE 802.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 11, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 11, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 615 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. For example, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

As described herein, a telecommunications system wherein management and control utilizing a software defined network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life-especially for simple M2M devices—through enhanced wireless management.

While examples of a telecommunications system in which DSS dynamic mode switch in TDMA can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine become a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine become a device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—DSS dynamic mode switch in TDMA—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for determining statistics associated with spectrum sharing in the frequency domain between at least two of a plurality of radio modes; receiving a first message from a user equipment, wherein the message comprises: an indication of a location of the user equipment, wherein the location is within the bounds of a cell area of a first base station, and an indication of one or more radio modes of the user equipment, wherein the one or more radio modes of the user equipment is new radio (NR) or long-term evolution (LTE); determining, based on the first message, a transmission time interval (TTI) for the one or more radio modes of the user equipment; and sending, to the user equipment, a second message, wherein the second message may include an indication of the TTI for the one or more radio modes. The indication of the TTI of the one or more radio modes of the user equipment may include alternating each time domain slot between NR and LTE. The indication of the TTI of the one or more radio modes of the user equipment may include alternating time domain slots between NR and LTE. The determining of the TTI is based on a buffer size of each radio. The TTI indicates use of continuous alternating slots for each one or more radio modes. Methods, systems, and apparatuses, among other things, as described herein may provide for receiving an indication that a UE is able to operate using multiple radio modes (e.g., wireless network standards). The multiple radio modes may include 5G NR or LTE. In response to receiving the indication, sending DSS related instructions to UE. The DSS related instructions may include assigning a time slot for each radio mode to operate. A method may include determining that there is no spectrum sharing in the frequency domain between at least two of a plurality of radio modes. Each one or more radio mode may include at least 2 or at least 4 continuous slots. See FIG. 7. The first message may include a fragmentation of PRB groups associated with the user equipment. All combinations in this paragraph (including the removal or addition of steps) are contemplated in a manner that is consistent with the other portions of the detailed description.

What is claimed:

1. A method comprising:
    receiving a first message from a user equipment, wherein the first message comprises:
        an indication of a location of the user equipment, wherein the location is within bounds of a cell area of a first base station, and
        an indication of one or more radio modes of the user equipment, wherein the one or more radio modes of the user equipment is new radio (NR) or long-term evolution (LTE);
    receiving information about a buffer size of a radio of the user equipment;
    determining a transmission time interval (TTI) for the one or more radio modes of the user equipment, wherein the determining the TTI comprises determining a number of time slots assigned to the user equipment for transmitting to the user equipment based on the buffer size of the radio of the user equipment, wherein transmitting to the user equipment comprises transmitting a first number of continuous alternating time slots for an NR mode or transmitting a second number of continuous alternating time slots for an LTE mode, wherein the first number of continuous alternating time slots and the second number of continuous alternating time slots are equal and are selected based on the buffer size of the radio of the user equipment, and wherein transmitting to the user equipment comprises transmitting with no frequency sharing among the NR mode and the LTE mode in frequency domain to reduce interference; and
    sending, to the user equipment, a second message, wherein the second message comprises an indication of the TTI for the one or more radio modes.

2. The method of claim 1, wherein the indication of the TTI of the one or more radio modes of the user equipment comprises alternating each time domain slot between NR and LTE.

3. The method of claim 1, wherein the receiving information about the buffer size of the radio of the user equipment comprises retrieving stored data buffer information at a radio network element.

4. The method of claim 1, wherein the TTI indicates use of continuous alternating slots for each one or more radio modes.

5. The method of claim 1, wherein the TTI indicates use of continuous alternating slots for each one or more radio modes, wherein each one or more radio mode comprises at least 2 continuous slots.

6. The method of claim 1, wherein the TTI indicates use of continuous alternating slots for each one or more radio modes, wherein each one or more radio mode comprises at least 4 continuous slots.

7. The method of claim 1, wherein the first message comprises a fragmentation of PRB groups associated with the user equipment.

8. A system comprising:
    one or more processors; and
    memory coupled with the one or more processors, the memory storing executable instructions that when executed by the one or more processors cause the one or more processors to effectuate operations comprising:
        receiving a first message from a user equipment, wherein the first message comprises:
            an indication of a location of the user equipment, wherein the location is within bounds of a cell area of a first base station, and
            an indication of one or more radio modes of the user equipment, wherein the one or more radio modes of the user equipment is new radio (NR) or long-term evolution (LTE);
        receiving information about a buffer size of a radio of the user equipment;
        determining, based on the first message and the information about the buffer size of the radio of the user equipment, a transmission time interval (TTI) for the one or more radio modes of the user equipment, wherein the determining the TTI comprises determining a number of time slots assigned to the user equipment for transmitting to the user equipment based on the buffer size of the radio of the user equipment, wherein transmitting to the user equipment comprises transmitting a first number of continuous alternating time slots for an NR mode or transmitting a second number of continuous alternating time slots for an LTE mode, wherein the first number of continuous alternating time slots and the second number of continuous alternating time slots are equal and are selected based on the buffer size of the radio of the user equipment, and wherein transmitting to the user equipment comprises transmitting with no frequency sharing among the NR mode and the LTE mode in frequency domain to reduce interference; and
        sending, to the user equipment, a second message, wherein the second message comprises an indication of the TTI for the one or more radio modes.

9. The system of claim 8, wherein the indication of the TTI of the one or more radio modes of the user equipment comprises alternating each time domain slot between NR and LTE.

10. The system of claim 8, wherein the receiving information about the buffer size of the radio of the user equipment comprises retrieving stored data buffer information at a radio network element.

11. The system of claim 8, wherein the TTI indicates use of continuous alternating slots for each one or more radio modes.

12. The system of claim 8, wherein the TTI indicates use of continuous alternating slots for each one or more radio modes, wherein each one or more radio mode comprises at least 2 continuous slots.

13. The system of claim 8, wherein the TTI indicates use of continuous alternating slots for each one or more radio modes, wherein each one or more radio mode comprises at least 4 continuous slots.

14. The system of claim 8, wherein the first message comprises a fragmentation of PRB groups associated with the user equipment.

15. A non-transitory computer readable storage medium storing computer executable instructions that when executed by a computing device cause said computing device to effectuate operations comprising:
- receiving a first message from a user equipment, wherein the first message comprises:
  - an indication of a location of the user equipment, wherein the location is within bounds of a cell area of a first base station, and
  - an indication of one or more radio modes of the user equipment, wherein the one or more radio modes of the user equipment is new radio (NR) or long-term evolution (LTE);
- receiving information about a buffer size of a radio of the user equipment;
- determining, based on the first message and the information about the buffer size of the radio of the user equipment, a transmission time interval (TTI) for the one or more radio modes of the user equipment, wherein the determining the TTI comprises determining a number of time slots assigned to the user equipment for transmitting to the user equipment based on the buffer size of the radio of the user equipment, wherein transmitting to the user equipment comprises transmitting a first number of continuous alternating time slots for an NR mode or transmitting a second number of continuous alternating time slots for an LTE mode, wherein the first number of continuous alternating time slots and the second number of continuous alternating time slots are equal and are selected based on the buffer size of the radio of the user equipment, and wherein transmitting to the user equipment comprises transmitting with no frequency sharing among the NR mode and the LTE mode in frequency domain to reduce interference; and
- sending, to the user equipment, a second message, wherein the second message comprises an indication of the TTI for the one or more radio modes.

16. The non-transitory computer readable storage medium of claim 15, wherein the indication of the TTI of the one or more radio modes of the user equipment comprises alternating each time domain slot between NR and LTE.

17. The non-transitory computer readable storage medium of claim 15, wherein the receiving information about the buffer size of the radio of the user equipment comprises retrieving stored data buffer information at a radio network element.

18. The non-transitory computer readable storage medium of claim 15, wherein the TTI indicates use of continuous alternating slots for each one or more radio modes.

19. The non-transitory computer readable storage medium of claim 15, wherein the TTI indicates use of continuous alternating slots for each one or more radio modes, wherein each one or more radio mode comprises at least 4 continuous slots.

20. The non-transitory computer readable storage medium of claim 15, wherein the first message comprises a fragmentation of PRB groups associated with the user equipment.

* * * * *